(12) United States Patent
Mo

(10) Patent No.: US 10,991,276 B2
(45) Date of Patent: Apr. 27, 2021

(54) CURVED SURFACE ADJUSTMENT MECHANISM AND BACKLIGHT MODULE

(71) Applicant: Shenzhen China Star Optoelectronics Technology Co., Ltd., Guangdong (CN)

(72) Inventor: Zhiping Mo, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 544 days.

(21) Appl. No.: 15/774,043

(22) PCT Filed: Jan. 19, 2018

(86) PCT No.: PCT/CN2018/073476
§ 371 (c)(1),
(2) Date: May 7, 2018

(87) PCT Pub. No.: WO2019/114093
PCT Pub. Date: Jun. 20, 2019

(65) Prior Publication Data
US 2019/0378440 A1     Dec. 12, 2019

(30) Foreign Application Priority Data

Dec. 12, 2017 (CN) .......................... 201711312711.2

(51) Int. Cl.
*H05K 1/00* (2006.01)
*G09F 9/30* (2006.01)
(Continued)

(52) U.S. Cl.
CPC ........ *G09F 9/301* (2013.01); *G02F 1/133305* (2013.01); *G02F 1/133308* (2013.01); *G02F 1/133611* (2013.01)

(58) Field of Classification Search
USPC .......................................................... 361/749
See application file for complete search history.

(56) References Cited

U.S. PATENT DOCUMENTS 6,739,115 B1 * 5/2004 Malini .................... B65B 11/10
53/210
2013/0294043 A1 * 11/2013 Ogura .................. B65D 5/5088
361/809
2016/0028042 A1   1/2016 Lee

FOREIGN PATENT DOCUMENTS

CN      103941456 A      7/2014
CN      105259607 A *    1/2016
(Continued)

*Primary Examiner* — Andargie M Aychillhum
(74) *Attorney, Agent, or Firm* — Leong C. Lei

(57) ABSTRACT

The present invention discloses a curved surface adjusting mechanism, which comprises a support, a backplate and an adjustment assembly; the support comprising two first frame portions opposite to each other; the adjusting assembly comprising a sliding block and a link hinged with the sliding block, the free end of the link hinged with the long side wall of the backplate, the sliding block which can slide along the longitudinal direction of the backplate. The present invention further discloses a backlight module. In the invention, a support is designed outside the backplate, and a slidable sliding block and a link connecting to the backplate are arranged between the support and the backplate. By the movement of the slider, it can freely switch the curved and flat states of the backplate, so that the surface display effect and flat display effect of TV can be converted more conveniently and efficiently.

16 Claims, 5 Drawing Sheets

(51) Int. Cl.
*G02F 1/1333* (2006.01)
*G02F 1/13357* (2006.01)

(56) References Cited

FOREIGN PATENT DOCUMENTS

| | | |
|---|---|---|
| CN | 205194228 U | 4/2016 |
| CN | 106847096 A | 6/2017 |

* cited by examiner

CURVED SURFACE ADJUSTMENT MECHANISM AND BACKLIGHT MODULE

RELATED APPLICATIONS

The present application is a National Phase of International Application Number PCT/CN2018/073476, filed Jan. 19, 2018, and claims the priority of China Application No. 201711312711.2, filed Dec. 12, 2017.

BACKGROUND OF THE INVENTION

1. Field of the Invention

The present invention relates to a technology of display, and more particularly, to a curved surface adjustment mechanism and a backlight module.

2. The Related Arts

With the improvement of living expenses, consumers are demanding higher and higher levels of screen experience. Especially presented on the TV size and quality, i.e., the greater size of the panel TV and more delicate picture quality. However, with the increasing of the size of the panel, the discrepancy of the visual acuity between the human eye and the flat-panel TV at different positions is obviously appeared, resulting in a significant decline in the viewing experience.

Therefore, the curved screen TV modeled on the human eye overcomes the problem of greater size due to the large difference in visual moment. Currently, curved surface TVs are being developed by numerous television manufacturers for providing a more comfortable viewing experience. However, the curved surface TV is not perfect, but there are also obvious defects. For example, the best visual experience of curved surface TV is only in the center of the TV, the rest will be due to the characteristics of the curved screen, the rest will be due to the characteristics of curved screen, resulting in distortion of the visual screen, and is more detrimental to the visual experience. It does not guarantee good visual experience on different occasions.

SUMMARY

In view of the shortcomings of the prior art, the present invention provides a curved surface adjusting mechanism and a backlight module, which can freely switch the display effect of curved surface and the flat surface.

In order to achieve the above purpose, the present invention adopts the following technical solutions: a curved surface adjustment mechanism, wherein which comprises a support, a backplate and an adjustment assembly; the support comprising two first frame portions opposite to each other, the two first frame portions arranged respectively on two sides in the lateral direction of the backplate, and both ends in the longitudinal direction of the backplate constrained by the support in the vertical direction without disconnecting from the first frame portion; the adjusting assembly comprising a sliding block and a link hinged with the sliding block, the free end of the link hinged with the long side wall of the backplate, the sliding block which can slide along the longitudinal direction of the backplate arranged on first frame portion of the support.

As one of the embodiments, a groove portion is recessly arranged on an inner wall of the first frame portion, and the adjusting assembly is contained in the groove portion.

As one of the embodiments, the support further comprises two second frame portions opposite to each other, and a bending portion which is inwardly bent from the bottom of the first frame portion; the first frame portion and the second frame portion surrounding to form a frame structure, and the backplate arranged between the bending portion and the first frame portion without arranging the adjustment assembly in the thickness direction.

As one of the embodiments, an elongated sliding groove is recessly arranged on the end of the inner wall of each of the first frame portion, a pin shaft is correspondingly arranged on the outer wall of the backplate, and the pin shaft is slidably arranged in the sliding groove.

As one of the embodiments, a stopper is convexly arranged on a portion of the first frame portion close to the second frame portion, and the end of the backplate is arranged between the bending portion and the stopper.

As one of the embodiments, a first sawtooth surface is arranged on the surface of the groove portion extending along the longitudinal direction thereof, a second sawtooth surface cooperating with the first sawtooth surface is arranged on the surface corresponding to the sliding block, and in each sawtooth of the second sawtooth surface, the tilt angle away from the sawtooth surface of the link is greater than the tilt angle of the other sawtooth surface.

As one of the embodiments, the first sawtooth surface is arranged on the surface of the groove portion located on the bending portion, and the second sawtooth surface is arranged on the bottom surface of the sliding block.

As one of the embodiments, the first sawtooth surface is arranged on the surface of the groove portion located on the first frame portion, and the second sawtooth surface is arranged on the side surface of the sliding block.

As one of the embodiments, the first frame portion comprises a guide strip convexly arranged from the groove portion, the cross section of the guide strip is an inverted trapezoid, and the first sawtooth surface is arranged on the surface of the guide strip; a guide groove is recessly arranged on the sliding block for inserting the guide strip, and the second sawtooth surface is arranged on the bottom surface of the guide groove.

Another purpose of the present invention is to provide a backlight module, which comprising the curved surface adjustment mechanism.

In the invention, a support is designed outside the backplate, and a slidable sliding block and a link connecting to the backplate are arranged between the support and the backplate. By the movement of the slider, it can freely switch the curved and flat states of the backplate, so that the surface display effect and flat display effect of TV can be converted more conveniently and efficiently.

DETAILED DESCRIPTION OF THE PREFERRED EMBODIMENTS

Technical implementation will be described below clearly and fully by combining with drawings made in accordance with an embodiment in the present invention.

The curved surface adjustment mechanism of the present invention can be used in a variety of backlight modules and curved display devices, including a support, a backplate, and an adjustment module. The backplate can be bent in its longitudinal direction, and can be used to carry and mount various kinds of structural parts and optical components of backlight modules, for example, a light guide plate, a light source, an optical film set, a plastic frame, etc. The support is used for constraining and protecting the adjusting assembly and the backplate.

Wherein the support has at least two opposite first frame portions, which are respectively located at two sides in the lateral direction of the backplate. Moreover, both ends in the longitudinal direction of the backplate are constrained by the support in the vertical direction, so that both ends in the longitudinal direction of the backplate does not disconnect from the first frame portion during the bending. The adjusting assembly mainly consists of a sliding block and a link hinged with the sliding block, the free end of the link is hinged with the long side wall of the backplate, and the sliding block which can slide along the longitudinal direction of the backplate is arranged on first frame portion of the support.

In the flat display state, the link does not take a push force by the sliding block, and the backplate is a flat shape. When switching between the flat display and the surface display, user only needs to push the sliding block to slide along the first frame portion, and the link takes a push force by the backplate in the longitudinal direction. However, both ends of the backplate do not move in the vertical direction because which are constrained by the first frame, so that the middle of the backplate can be arched and naturally bend. It only needs to lock the bending state to switch from flat display to curved display. Conversely, when it needs to switch from curved display to flat display, it only needs to push the sliding block in the reverse direction to remove the push force of the link, to restore the backplate to be a flat state. The present invention will be further described with reference to specific embodiments.

Embodiment 1

Figure 1:
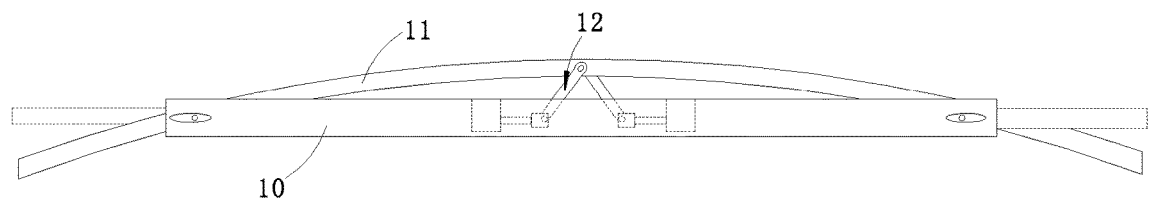
FIG. 1 is an adjusting process diagram of a curved surface adjustment mechanism in accordance with the embodiment 1 in the present invention.
Figure 2:
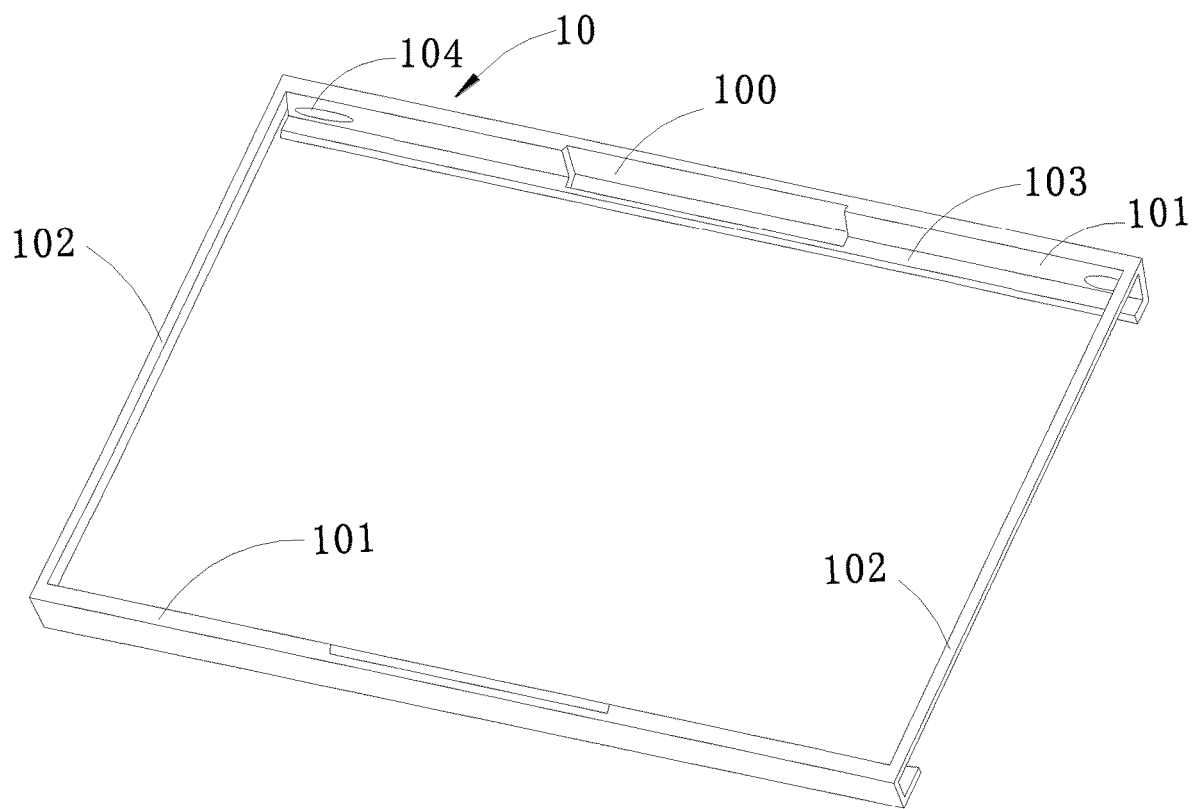
FIG. 2 is a structural illustration of a support in accordance with the embodiment 1 in the present invention.
Figure 3:
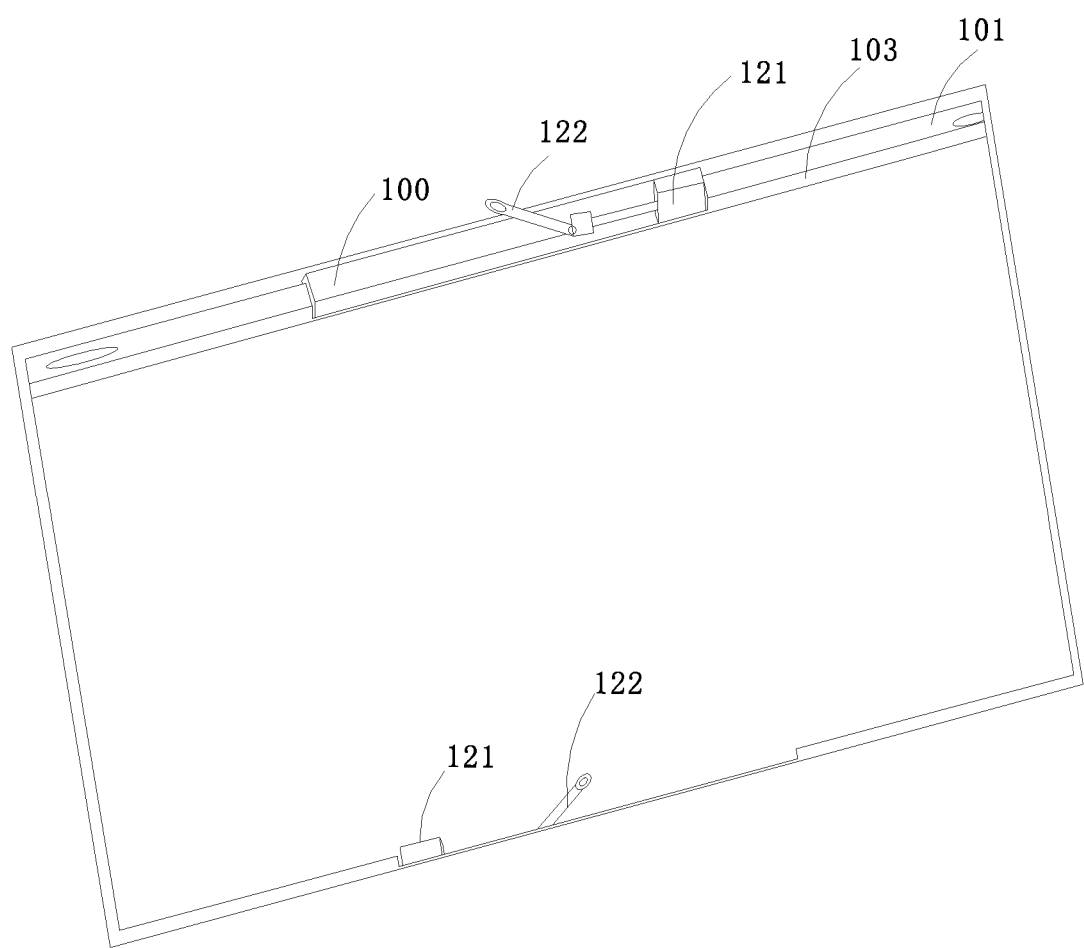
FIG. 3 is a structural illustration of a part of the curved surface adjustment mechanism in accordance with the embodiment 1 in the present invention.

As shown in FIGS. 1 to 3, The curved surface adjustment mechanism of the present invention comprises a support 10, a backplate 11 and an adjustment assembly 12. The support 10 comprises two first frame portions 101 opposite to each other. The two first frame portions 101 are arranged respectively on two sides in the lateral direction of the backplate 11, and both ends in the longitudinal direction of the backplate 11 constrained by the support 10 in the vertical direction without disconnecting from the first frame portion 101. The adjusting assembly 12 comprises a sliding block 121 and a link 122 hinged with the sliding block 121. The free end of the link 122 is hinged with the long side wall of the backplate 11. The sliding block 121 which can slide along the longitudinal direction of the backplate 10, is arranged on first frame portion 101 of the support 10. Here, the free end of the link 122 is hinged to the middle of the long side sidewall of the backplate 11, so that the bending degree of the backplate 11 is more uniform.

Wherein the support 10 is a frame structure. The first frame portion 101 is two opposite frames of the frame structure. The two second frame portions 102 is treated as the other two frames of the support 10, to form a rectangle frame structure with the first frame portion 101.

Referring to FIGS. 2 to 3, a groove portion 100 is recessly arranged on an inner wall of the first frame portion 101, and the sliding block 121 and the link 122 of the adjusting assembly is simultaneously contained in the groove portion. When the curved surface adjusting mechanism is assembled, the adjusting assembly 12 is sandwiched between the support 10 and the backplate 11. In addition, the bottom of the first frame portion 101 on each side of the support 10 is also bent inwardly to form a bending portion 103, and the groove portion 100 is simultaneously formed on the surface of the frame portion 101 and the bending portion 103, and the backplate 11 is arranged between the bending portion 103 and the first frame portion 101 without arranging the adjustment assembly 12 in the thickness direction. That is, the length of the backplate 11 is greater than the distance between the two second frame portions 102, the thickness of the second frame portion 102 is less than the thickness of the first frame 1 portion 101, there is a vertical interval between the second frame portion 102 and the bending portion 103, and the second frame portion 102 blocks the upper surfaces of the two ends of the backplate 11.

In the present embodiment, there are two adjusting adjustment assembly 12, and the adjusting assembly 12 is respectively arranged on the side of each long side of the backplate 11. Moreover, two of the adjusting assembly 12 are respectively located at two sides of the middle of the backplate 11 in the longitudinal direction of the backplate 11, two of the sliding block 121 on different sides can be from the opposite direction toward the middle to push the corresponding link 122, so that the middle of the backplate 11 is arched. After the backplate 11 is arched, the links 122 located on different sides of the middle of the backplate 11, which support the backplate 11 in a form of horn.

Figure 4:
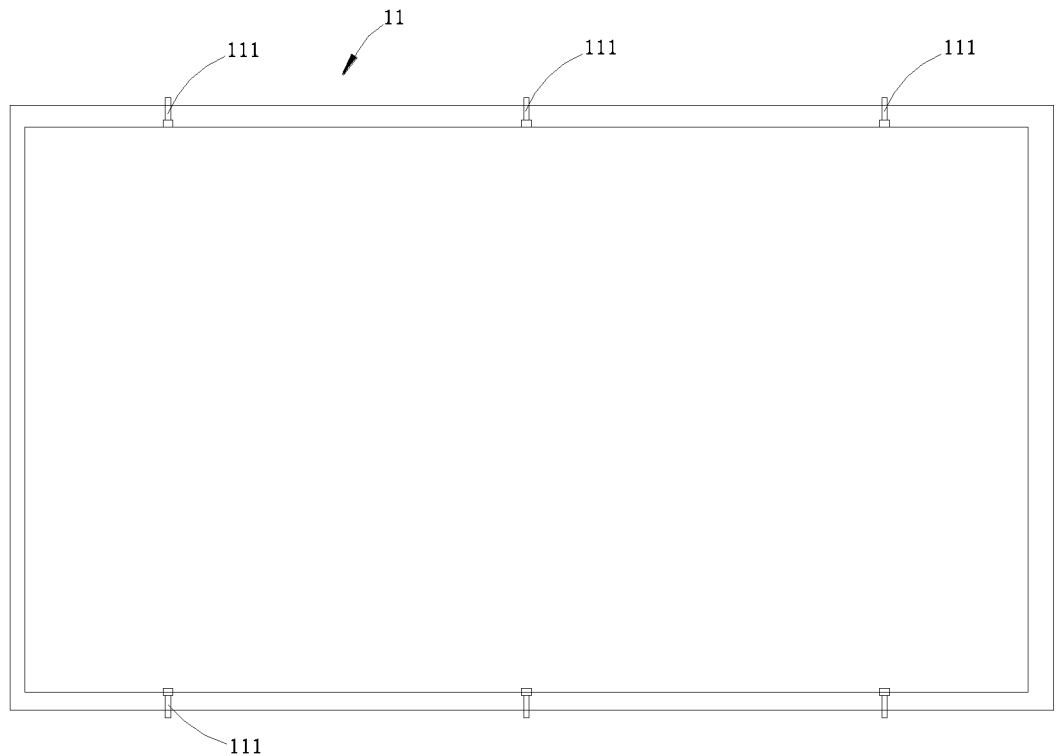
FIG. 4 is a structural illustration of a backplate in accordance with the embodiment 1 in the present invention.

As shown in FIG. 4, pin shafts 111 are simultaneously fixed at the middle and two ends on each side of each long side of the backplate 11, and an elongated sliding groove 104 is recessly arranged on the end of the inner wall of each of the first frame portion 101. The pin shaft 111 at each end of the backplate 11 is slidably arranged in the sliding groove 104, and the pin shaft 111 at the middle of the backplate 11 is hinged to the free end of the link 122. The sliding groove 104 extends in the longitudinal direction of the first frame portion 101 and may be an ellipse shape or a waist round shape. A plurality of ribs may be arranged in the sliding groove 104, and the plurality of ribs divide the sliding groove 104 into a plurality of space to contain the pin shaft. When the pin 111 is abutted on different ribs and located in different pin containing spaces, the backplate 11 has different curvatures.

In the present embodiment, the length of the backplate 11 is greater than the length of the support 10. The sliding groove 104 is close to the end of the support 10, so that the two ends of the backplate 11 are simultaneously constrained by the sliding groove 104 and the second frame portion 102 after the backplate 11 is bent. The existence of the second frame portion 102 allows the curvature of the backplate 11 to be limited in a certain range.

Figure 5A:
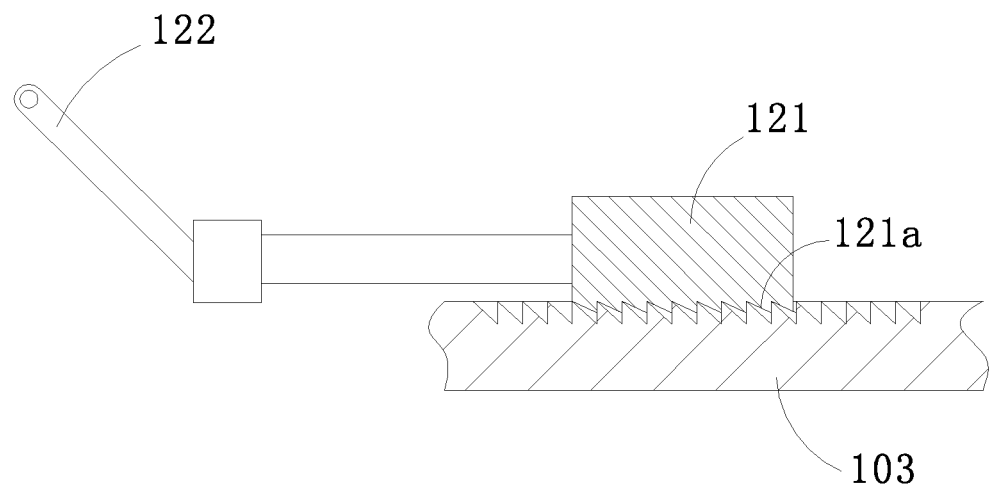
FIG. 5a is a sliding principle diagram of a sliding block in accordance with the embodiment 1 in the present invention.
Figure 5B:
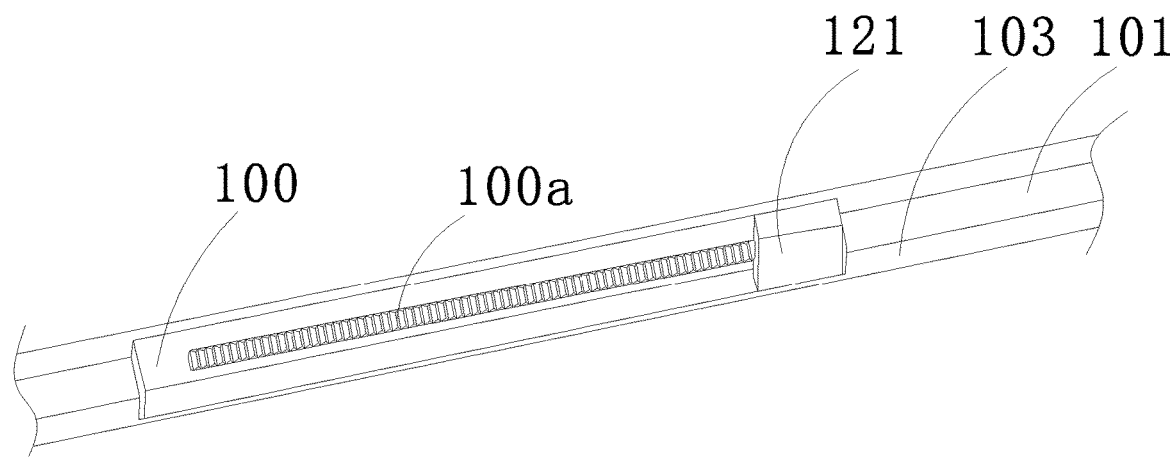
FIG. 5b is another sliding principle diagram of a sliding block in accordance with the embodiment 1 in the present invention.

FIG. 5a is a sliding principle diagram of a sliding block in accordance with the embodiment 1 in the present invention; and FIG. 5b is another sliding principle diagram of a sliding block in accordance with the embodiment 1 in the present invention.

As shown in FIG. 5a, a first sawtooth surface 100a is arranged on the surface of the groove portion located on the bending portion 103 extending along the longitudinal direction thereof, a second sawtooth surface 121a cooperating with the first sawtooth surface is arranged on the bottom of the sliding block 121, and in each sawtooth of the second sawtooth surface 121a, the tilt angle away from the sawtooth surface of the link 122 is greater than the tilt angle of the other sawtooth surface. When the sliding block 121 is moved toward the middle to push the link 122, the link 122 is rotated to arch the backplate 11. The sliding block 121 will not be easily displaced under the reverse push force of the backplate 11 to keep the backplate 11 in a bent state.

As shown in FIG. 5b, the first sawtooth surface 100a is instead to arrange on the surface of the groove portion 100 located on the first frame portion 101, and the second sawtooth surface 121a is arranged on the side surface of the sliding block 121. In order to achieve the cooperation between the first sawtooth surface 100a and the second sawtooth surface 121a to be better, a guide strip on the first frame portion 101 is further convexly arranged from the groove portion 100, and the cross section of the guide strip is an inverted trapezoid. Correspondingly, a guide groove is recessly arranged on the sliding block for inserting the guide strip, and the second sawtooth surface is arranged on the bottom surface of the guide groove. There is a certain tolerance between the first sawtooth surface 100a and the second sawtooth surface 121a, so that both have a certain unlocking margin. When the guide strip passes through the guide groove of the sliding block 121, the sliding block 121 can slide along the guide strip. When an external force separates the first sawtooth surface 100a from the second sawtooth surface 121a, the sliding block 121 can be unlocked, without being directly locked to cause the sliding block 121 to move only in one direction.

Embodiment 2

Figure 6:
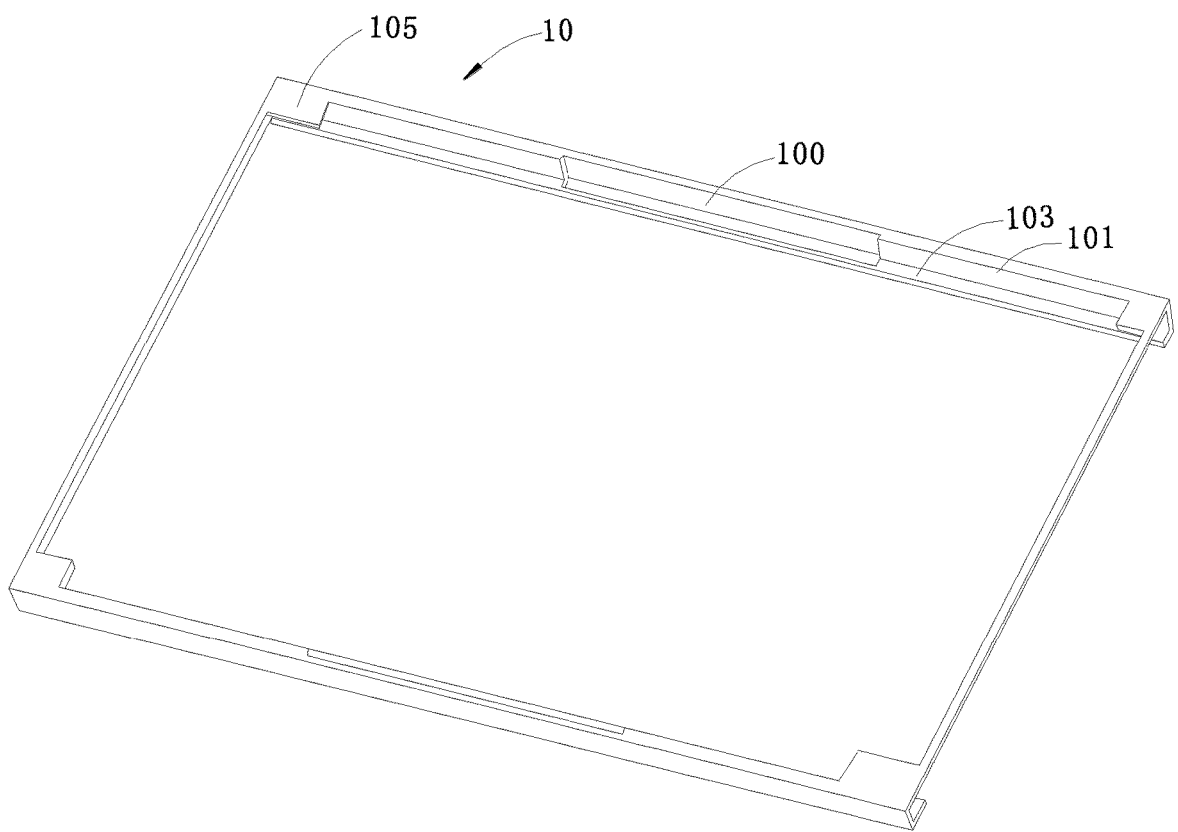
FIG. 6 is a structural illustration of a support in accordance with the embodiment 2 in the present invention.
Figure 7:
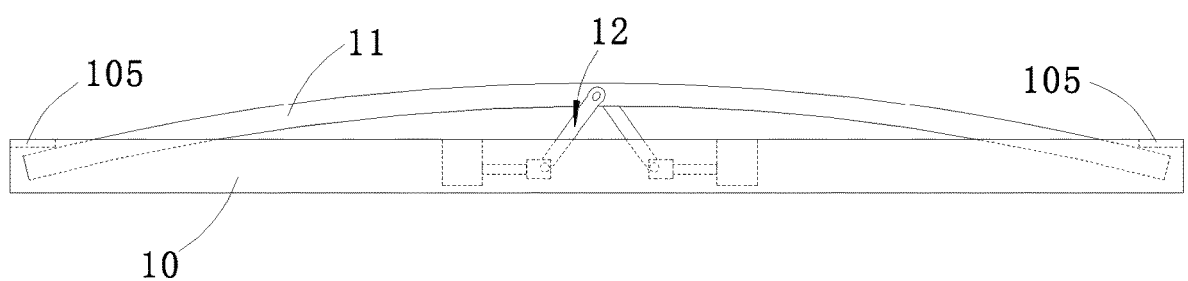
FIG. 7 is an adjusting process diagram of a curved surface adjustment mechanism in accordance with the embodiment 2 in the present invention.

As shown in FIGS. 6 and 7, it is different from the embodiment 1 that, the first frame portion 101 of the present embodiment does not have the sliding slot 104. However, a stopper 105 is convexly arranged on a portion of the first frame portion 101 close to the second frame portion 102. The stopper 105 is located on the top surface of each corner of the support 10, and the end of the backplate 11 is arranged between the bending portion 103 and the stopper 105. The stopper 105 has a function of constraining the end of the backplate 11, it can prevent the backplate 11 from being bent excessively to cause two of the ends to be disconnected from the support 10. The present embodiment can also be applied to the case that the length of the backplate 11 is not greater than the length of the first frame portion 101.

In the invention, a support is designed outside the backplate, and a slidable sliding block and a link connecting to the backplate are arranged between the support and the backplate. By the movement of the slider, it can freely switch the curved and flat states of the backplate, so that the curved surface display effect and flat display effect of TV can be converted more conveniently and efficiently.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A curved surface adjustment mechanism, wherein which comprises a support, a backplate and an adjustment assembly; the support comprising two first frame portions opposite to each other, the two first frame portions arranged respectively on two sides in the lateral direction of the backplate, and both ends in the longitudinal direction of the backplate constrained by the support in the vertical direction without disconnecting from the first frame portion; the adjusting assembly comprising a sliding block and a link hinged with the sliding block, the free end of the link hinged with the long side wall of the backplate, the sliding block which can slide along the longitudinal direction of the backplate arranged on first frame portion of the support; wherein a groove portion is recessly arranged on an inner wall of the first frame portion, and the adjusting assembly is contained in the groove portion; wherein the support further comprises two second frame portions opposite to each other, and a bending portion which is inwardly bent from the bottom of the first frame portion; the first frame portion and the second frame portion surrounding to form a frame structure, and the backplate arranged between the bending portion and the first frame portion without arranging the adjustment assembly in the thickness direction.

2. The curved surface adjustment mechanism as recited in claim 1, wherein an elongated sliding groove is recessly arranged on the end of the inner wall of each of the first frame portion, a pin shaft is correspondingly arranged on the outer wall of the backplate, and the pin shaft is slidably arranged in the sliding groove.

3. The curved surface adjustment mechanism as recited in claim 1, wherein a stopper is convexly arranged on a portion of the first frame portion close to the second frame portion, and the end of the backplate is arranged between the bending portion and the stopper.

4. The curved surface adjustment mechanism as recited in claim 1, wherein a first sawtooth surface is arranged on the surface of the groove portion extending along the longitudinal direction thereof, a second sawtooth surface cooperating with the first sawtooth surface is arranged on the surface corresponding to the sliding block, and in each sawtooth of the second sawtooth surface, the tilt angle away from the sawtooth surface of the link is greater than the tilt angle of the other sawtooth surface.

5. The curved surface adjustment mechanism as recited in claim 4, wherein the first sawtooth surface is arranged on the surface of the groove portion located on the bending portion, and the second sawtooth surface is arranged on the bottom surface of the sliding block.

6. The curved surface adjustment mechanism as recited in claim 4, wherein the first sawtooth surface is arranged on the surface of the groove portion located on the first frame portion, and the second sawtooth surface is arranged on the side surface of the sliding block.

7. The curved surface adjustment mechanism as recited in claim 6, wherein the first frame portion comprises a guide strip convexly arranged from the groove portion, the cross section of the guide strip is an inverted trapezoid, and the first sawtooth surface is arranged on the surface of the guide strip; a guide groove is recessly arranged on the sliding block for inserting the guide strip, and the second sawtooth surface is arranged on the bottom surface of the guide groove.

8. The curved surface adjustment mechanism as recited in claim 3, wherein a first sawtooth surface is arranged on the surface of the groove portion extending along the longitudinal direction thereof, a second sawtooth surface cooperating with the first sawtooth surface is arranged on the surface corresponding to the sliding block, and in each sawtooth of the second sawtooth surface, the tilt angle away from the sawtooth surface of the link is greater than the tilt angle of the other sawtooth surface.

9. A backlight module, wherein which comprises a curved surface adjustment mechanism, the curved surface adjustment mechanism comprising a support, a backplate and an adjustment assembly; the support comprising two first frame portions opposite to each other, the two first frame portions arranged respectively on two sides in the lateral direction of the backplate, and both ends in the longitudinal direction of the backplate constrained by the support in the vertical direction without disconnecting from the first frame portion; the adjusting assembly comprising a sliding block and a link hinged with the sliding block, the free end of the link hinged with the long side wall of the backplate, the sliding block which can slide along the longitudinal direction of the backplate arranged on first frame portion of the support; wherein a groove portion is recessly arranged on an inner wall of the first frame portion, and the adjusting assembly is contained in the groove portion; wherein the support further comprises two second frame portions opposite to each other, and a bending portion which is inwardly bent from the bottom of the first frame portion; the first frame portion and the second frame portion surrounding to form a frame structure, and the backplate arranged between the bending portion and the first frame portion without arranging the adjustment assembly in the thickness direction.

10. The backlight module as recited in claim 9, wherein an elongated sliding groove is recessly arranged on the end of the inner wall of each of the first frame portion, a pin shaft is correspondingly arranged on the outer wall of the backplate, and the pin shaft is slidably arranged in the sliding groove.

11. The backlight module as recited in claim 9, wherein a stopper is convexly arranged on a portion of the first frame portion close to the second frame portion, and the end of the backplate is arranged between the bending portion and the stopper.

12. The backlight module as recited in claim 9, wherein a first sawtooth surface is arranged on the surface of the groove portion extending along the longitudinal direction thereof, a second sawtooth surface cooperating with the first sawtooth surface is arranged on the surface corresponding to the sliding block, and in each sawtooth of the second sawtooth surface, the tilt angle away from the sawtooth surface of the link is greater than the tilt angle of the other sawtooth surface.

13. The backlight module as recited in claim 12, wherein the first sawtooth surface is arranged on the surface of the groove portion located on the bending portion, and the second sawtooth surface is arranged on the bottom surface of the sliding block.

14. The backlight module as recited in claim 12, wherein the first sawtooth surface is arranged on the surface of the groove portion located on the first frame portion, and the second sawtooth surface is arranged on the side surface of the sliding block.

15. The backlight module as recited in claim 14, wherein the first frame portion comprises a guide strip convexly arranged from the groove portion, the cross section of the guide strip is an inverted trapezoid, and the first sawtooth surface is arranged on the surface of the guide strip; a guide groove is recessly arranged on the sliding block for inserting the guide strip, and the second sawtooth surface is arranged on the bottom surface of the guide groove.

16. A backlight module, wherein which comprises a curved surface adjustment mechanism, the curved surface adjustment mechanism comprising a support, a backplate and an adjustment assembly; the support comprising two first frame portions opposite to each other, the two first frame portions arranged respectively on two sides in the lateral direction of the backplate, and both ends in the longitudinal direction of the backplate constrained by the support in the vertical direction without disconnecting from the first frame portion; the adjusting assembly comprising a sliding block and a link hinged with the sliding block, the free end of the link hinged with the long side wall of the backplate, the sliding block which can slide along the longitudinal direction of the backplate arranged on first frame portion of the support; a groove portion is recessly arranged on an inner wall of the first frame portion, and the adjusting assembly is contained in the groove portion; the support further comprises two second frame portions opposite to each other, and a bending portion which is inwardly bent from the bottom of the first frame portion; the first frame portion and the second frame portion surrounding to form a frame structure, and the backplate arranged between the bending portion and the first frame portion without arranging the adjustment assembly in the thickness direction; a stopper is convexly arranged on a portion of the first frame portion close to the second frame portion, and the end of the backplate is arranged between the bending portion and the stopper; a first sawtooth surface is arranged on the surface of the groove portion extending along the longitudinal direction thereof, a second sawtooth surface cooperating with the first sawtooth surface is arranged on the surface corresponding to the sliding block, and in each sawtooth of the second sawtooth surface, the tilt angle away from the sawtooth surface of the link is greater than the tilt angle of the other sawtooth surface.

\* \* \* \* \*